Sept. 27, 1960   W. ERNST   2,954,221
WEIGHING DEVICE
Filed June 26, 1957
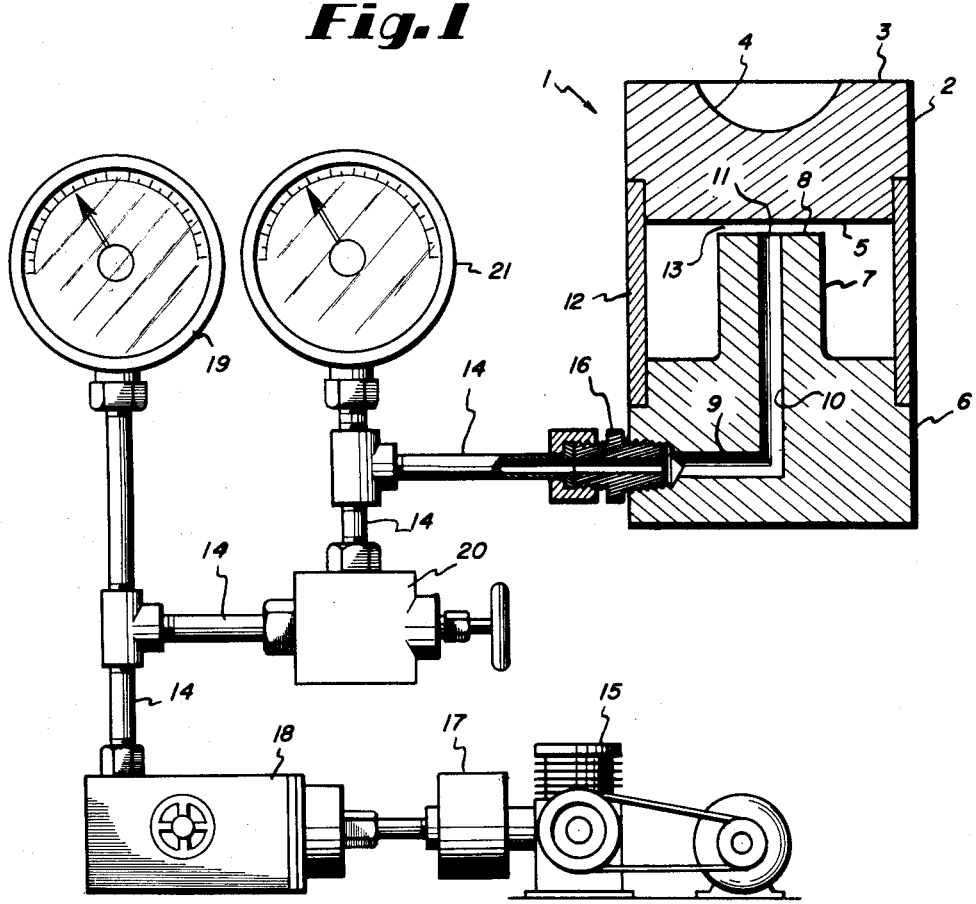
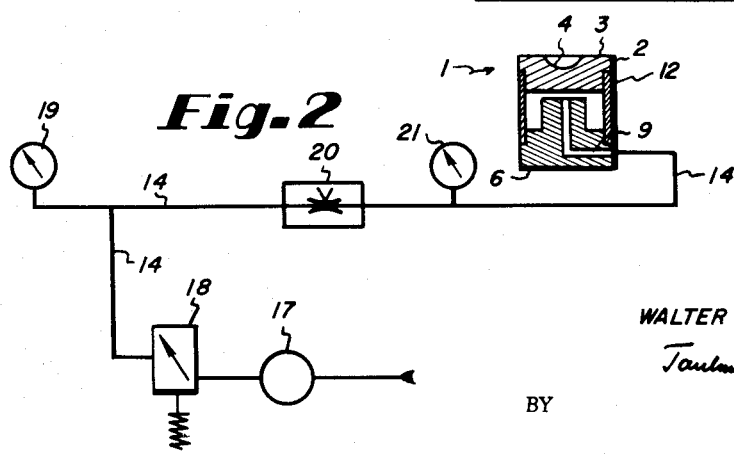
INVENTOR
WALTER ERNST
BY
ATTORNEYS

United States Patent Office 2,954,221
Patented Sept. 27, 1960

2,954,221
WEIGHING DEVICE

Walter Ernst, Dayton, Ohio, assignor to The Commonwealth Engineering Company of Ohio, Dayton, Ohio Filed June 26, 1957, Ser. No. 668,148
3 Claims. (Cl. 265—47)

The present invention relates to an apparatus and method for weighing loads, more particularly to a weighing device comprising a load cell having an air gap which is variable in response to a load upon said cell to vary the pressure in a fluid pressure line.

It is the principal object of this invention to provide an improved weighing device operable by fluid pressure.

It is another object of this invention to provide an improved load cell which comprises a minimum of parts and is simple in construction.

It is a further object of this invention to provide a method of weighing loads by varying a fluid under pressure.

It is an additional object of this invention to provide a weighing device for weighing loads by noting the difference between the pressure of a source of fluid under pressure and a pressure from said source generated in response to the load.

It is still another object of this invention to provide an accurate and simplified weighing device.

Other objects and advantages of this invention will become apparent upon reference to the accompanying description when taken in conjunction with the following drawings wherein—

Figure 1 is a side elevational view of the weighing device of this invention with the load-cell thereof being shown in a vertical section; and Figure 2 is a schematic view of the load-cell of the weighing device illustrated in Figure 1.

This invention essentially comprises a load cell with an air gap therein which is connected to a source of fluid under pressure. An adjustable restrictor is provided to reduce the pressure of the fluid discharged through the air gap. A first gauge is positioned between the restrictor and the air gap to measure the pressure in the line as it varies because of the variation in the air gap in proportion to the load applied upon the load-cell. A second gauge is provided which measures the pressure as it comes from the source of fluid pressure. The difference in readings between the two gauges will indicate the load upon the load-cell.

The specific embodiment of the invention is illustrated in Figure 1 wherein like reference symbols indicate the same parts throughout the various views. The weighing device comprises a load-cell 1 which has a head or load supporting member 2, the upper surface of which comprises a load supporting surface 3. There is a socket 4 in the load supporting surface 3 for application of the load through a ball and socket joint. The lower surface of the load supporting member is indicated at 5. There is a base 6 which has a raised central portion 7 with an upper surface 8. There is a fluid pressure passage in the base which comprises a radial passage 9 which opens on one of the side faces of the base and is connected at its inner end to a longitudinally extending passage 10 which has a discharge opening 11 on the upper surface 8 of the base.

A tubular load carrying member 12 connects the base and a head, as illustrated in Figure 1. In the normal or no-load position the tubular member positions the head and the base, as illustrated in Figure 1, so that there is a space between the upper surface 8 of the base and the lower surface 5 of the head to form an air gap 13. Hence, the fluid under pressure as it is emitted from the discharge opening 11 is discharged through the air gap 13 and to the atmosphere through suitable openings in the tubular member.

The tubular load carrying member is compressible under a vertical load but is not permanently deformed within the range of movement corresponding to the air gap. The load carrying member has a resistance against lateral bending so that side components of load are virtually without effect on the load-cell. Consequently, the cell measures only vertical components of the load.

The load-cell 1 is connected by a conduit or fluid pressure line 14 to a source of fluid pressure 15 which may be an air compressor. The line 14 is connected to the base by a fitting indicated at 16.

The air, as it is discharged from the compressor 15, passes through a filter 17 and a regulator 18 which regulates the pressure of the air from the air compressor so that a substantially constant pressure is pumped into the line 14. A pressure gauge 19 is connected to the line 14 for measuring the pressure as it is discharged from the source of the air pressure.

An adjustable restrictor 20 is placed in the line 14 for the purpose of reducing the pressure of the air discharged from the load-cell air gap. A second pressure gauge 21 is connected into the line 14 between the restrictor 20 and the load-cell 1. The gauges 19 and 21 are similar in that they measure the same pressure range. The maximum pressure which can be measured by the gauges may be a suitable deflection of the supply air pressure.

With the above structure of the weighing device of this invention in mind the operation thereof will next be described.

When the maximum load capable of being measured by this weighing device is applied, the air gap 13 will be closed and both of the gauges 19 and 21 will read the same since the air compressor will be discharging into essentially a closed system. Consequently, the pressure on both sides of the adjustable restrictor 20 will be the same. With the air gap at its maximum spacing of the no-load condition, the adjustable restrictor is adjusted to establish such a pressure in the line 14 between the restrictor and the load-cell which will represent the minimum pressure indicated on the gauge 21. Thus, when any load is placed upon the load-cell, the gauge 21 will read between the minimum reading at no-load and the air supplied pressure previously indicated at the maximum load. The gauge 19, however, will continue its reading which is the pressure of the source of fluid under pressure. The difference in readings between the gauges 19 and 21 will give accurate indications of the load upon the cell. These readings may be calibrated to give the load in units of weight.

The weighing device may be calibrated with weights or with a testing machine.

Thus, it can be seen that the weighing device of this invention is rugged, compact and simple, cannot be overloaded, and operates without the need for electronics and other voltage sensitive devices. Furthermore, this weighing device operates independent of temperature variations. The load-cell, since it comprises a minimum of parts, is practically indestructable. The accuracy of the readings will depend solely on the scale and error of the load measuring gauges. Furthermore, the weighing device is not susceptible to lateral components of the load since the tubular supporting member is resistant to virtually all the side pressures of the load. Consequently, the weighing device of this invention provides an accurate apparatus for obtaining the vertical components of a load by the action of fluid pressure.

It will be understood that this invention is susceptible to modification in order to adapt it to different usages and conditions, and, accordingly, it is desired to comprehend such modifications within this invention as may fall within the scope of the appended claims.

What is claimed is:

1. In a weighing device, a load-cell comprising a load supporting member and a base, and a tubular member compressible along its longitudinal axis connecting said load supporting member and said base to form the sole load carrying column of said load-cell, said tubular member being secured to the outer edge of the lower surface of said load carrying member and to the outer edge of the top surface of said base so that the load-cell will resist virtually all lateral components of load applied to the load supporting member, there being an air gap between said load supporting member and said base variable in proportion to the compression of said tubular member by a load on said load-cell, a source of fluid pressure connected to said air gap, and means for measuring the variation of pressure in said fluid pressure connection in response to variations in said air gap to indicate the load on said load-cell.

2. In a weighing device, a load-cell for connection to a fluid pressure line and comprising a load supporting member, a base having a passage therethrough opening to a surface thereof opposed from a surface of said load carrying member, said load supporting member and said base having the same diameter, a tubular member compressible along its longitudinal axis interconnecting said load supporting member and said base but spacing said load supporting member and base at no load to form an air gap between the surface having the passage therethrough and opposed load supporting surface, said tubular member being connected to the peripheral surfaces of said base and load supporting member so as to resist virtually all lateral components of load exerted on said load carrying member, the range of movement of said tubular member to close said air gap being less than that necessary to permanently deform said tubular member, a source of fluid pressure connected to said air gap, and means for measuring the variation of pressure in said fluid pressure connection in response to variations in said air gap to indicate the load on said load-cell.

3. An apparatus for measuring the vertical component of a load by the action of fluid pressure and comprising, a load supporting member, a base, there being a projection on said base co-axial with the central axis of the base and extending toward said load supporting member, there being a passage in said base opening on the top surface of said projection, a tubular member compressible along its longitudinal axis connecting said load supporting member and said base to form the sole load carrying column of said load-cell, said tubular member connecting said base and load supporting member so as to space the top of said projection from the opposed surface of said load supporting member so as to form an air space at no load, a line connecting a source of fluid under pressure to said base passage, and means for measuring the variation of pressure in said fluid pressure line in response to variations in said air gap to indicate the load on said load-cell.

References Cited in the file of this patent

UNITED STATES PATENTS

| | | |
|---|---|---|
| 2,396,916 | Guthrie | Mar. 19, 1946 |
| 2,487,595 | Ruge | Nov. 8, 1949 |
| 2,592,569 | Henderson | Apr. 15, 1952 |
| 2,636,380 | Van Dorn | Apr. 28, 1953 |
| 2,663,562 | Hendrickson | Dec. 22, 1953 |
| 2,669,864 | Brewster | Feb. 23, 1954 |
| 2,754,107 | Ernst | July 10, 1956 |
| 2,755,057 | Knobel | July 17, 1956 |
| 2,830,803 | Doyle | Apr. 15, 1958 |